(12) United States Patent
Jahromi

(10) Patent No.: US 10,697,734 B1
(45) Date of Patent: Jun. 30, 2020

(54) ATTACHABLE AIMING CORRECTOR FOR GUN SIGHTS

(71) Applicant: Omid Jahromi, Playa Vista, CA (US)

(72) Inventor: Omid Jahromi, Playa Vista, CA (US)

(73) Assignee: Aimpoint AB, Malmo (SE)

( * ) Notice: Subject to any disclaimer, the term of this patent is extended or adjusted under 35 U.S.C. 154(b) by 0 days.

(21) Appl. No.: 16/699,589

(22) Filed: Nov. 30, 2019

Related U.S. Application Data

(62) Division of application No. 15/990,815, filed on May 28, 2018, now Pat. No. 10,502,530.

(51) Int. Cl.
*F41G 3/26* (2006.01)
*F41G 3/32* (2006.01)

(52) U.S. Cl.
CPC ......... *F41G 3/2683* (2013.01); *F41G 3/2655* (2013.01); *F41G 3/323* (2013.01)

(58) Field of Classification Search
CPC ... F41G 3/22; F41G 3/26; F41G 3/265; F41G 3/2655; F41G 3/2661; F41G 3/2683; F41G 3/323
See application file for complete search history.

(56) References Cited

U.S. PATENT DOCUMENTS

| 8,749,887 | B2 | 6/2014 | Jahromi | |
|---|---|---|---|---|
| 9,164,269 | B1 | 10/2015 | Jahromi | |
| 9,644,920 | B2 * | 5/2017 | Jahromi | F41G 1/38 |
| 2005/0039370 | A1 * | 2/2005 | Strong | F41G 1/473 |
| | | | | 42/130 |
| 2016/0266372 | A1 * | 9/2016 | Baker | G02B 23/14 |

FOREIGN PATENT DOCUMENTS

EP            1930760 A1 *  6/2008  ............. G02B 23/02

* cited by examiner

*Primary Examiner* — Stephen Johnson

(57) ABSTRACT

This invention discloses a method for correcting the point of aim in riflescopes or other optical weapon sights. The point of aim is corrected by attaching one or more corrector wedge prisms in front of the riflescope. Each wedge prism shifts the point of aim by a predetermined amount such as 5 cm at 100 m or 10 cm at 100 m, etc. A shooter can zero-in his rifle by first firing a set of test shots to determine how far off the bullets hit from the desired point of impact. He then selects one or more wedge prisms supplied with the riflescope and attaches them to the front (objective side) of the riflescope. The wedge prisms shift the riflescope's point of aim and bring it in alignment with the rifle's point of impact.

17 Claims, 8 Drawing Sheets

ATTACHABLE AIMING CORRECTOR FOR GUN SIGHTS

I. CROSS-REFERENCE TO RELATED APPLICATIONS

This is a divisional application carved out of application Ser. No. 15/990,815 filed on May 28, 2018 now U.S. Pat. No. 10,502,530. This application claims the benefit of the earlier filing date of said prior-filed application which is incorporated herein by reference in its entirety.

Parts of the specification and the drawings that were not relevant to the claims presented herein have been omitted. Some editorial updates have been made to the remaining text to better illustrate the invention.

No new material has been added.

II. FIELD OF THE INVENTION

This invention relates to optical weapon sights such as riflescopes, reflector sights and holographic sights which superimpose a reticle pattern on an image of the target.

III. BACKGROUND OF THE INVENTION

A riflescope (also called a "scope" for short) is an optical weapon sight based on the Keplerian telescope. In its most basic form, a riflescope is a Keplerian telescope with a reticle or cross hairs added to mark the "point of aim". A riflescope must be mounted on a rifle such that its aiming axis (optical axis) is aligned with the rifle's barrel axis as shown in FIG. 6. However, due to mechanical tolerances, it is hardly possible to achieve a precise alignment the first time a riflescope is mounted on a rifle. The trajectory of the bullet must also be considered so additional corrections in the vertical direction might be necessary depending on target distance. In view of these considerations, riflescopes include means for precise vertical (elevation) and horizontal (windage) adjustments to the point of aim. The process of adjusting or correcting the point of aim of a riflescope so that the point of aim and point of impact coincide is called "zeroing-in". Since a rifle's bullet follows a ballistic trajectory, a rifle is zeroed-in at a known distance, say 100 m. At other distances, the rifle will shoot a predictable amount above or below the point of aim.

Early riflescopes were equipped with an external-adjustment system built into the mounts. Their point of aim was adjusted by mounts having micrometer windage and elevation mechanisms that moved the entire scope laterally and/or vertically. An advantage of external-adjustment scopes is that all the lens elements and the reticle remain centered on the same optical axis, providing highest image quality. The disadvantage of the external-adjustment mechanism is that the mounts must be able to support the entire weight of the riflescope under recoil. The external adjust mechanism is also bulky, heavy and susceptible to mud and dirt when used in the field.

Most modern riflescopes have an internal-adjustment mechanism using threaded screws mounted in turrets. The screws are connected to external knobs which are accessible by the shooter. Turning the knobs moves the reticle assembly inside the main tube against spring pressure. The knobs have clearly marked graduations around their circumference and many have a ball-detent system that clicks as the adjustment screws are turned. Each graduation or click represents a change in reticle position such that the point of aim is shifted by a small amount on the target. In modern riflescopes the graduations are commonly expressed as 1 cm at 100 m or 0.5 inch at 100 yards. The graduations may also be expressed in minutes of arc (MOA) or milliradians (mil). For the purpose of zeroing-in a rifle, 1 MOA is considered to be equal to 1 inch at 100 yards. Similarly, 0.1 mil corresponds to 1 cm at 100 m. These conventions are used in the present invention as well.

In recent years, several optical adjustment mechanisms have been invented by the present author to replace the mechanical adjustment mechanism described above. U.S. Pat. No. 8,749,887 issued on Jun. 10, 2014 describes a riflescope wherein a pair of movable wedge prisms are positioned between the objective lens and its focal plane. U.S. Pat. No. 9,164,269 issued on Oct. 20, 2015 and U.S. Pat. No. 9,644,620 issued on May 9, 2017 describe mechanisms that utilize tiltable and rotatable wedge prisms for adjusting the point of aim in a riflescope.

The present invention discloses a simpler design: the point of aim is adjusted by attaching one or more wedge prisms in front of the objective.

IV. SUMMARY OF THE INVENTION

This invention introduces a method for zeroing-in an optical weapon sight by attaching one or more thin wedge prisms to the front of the sight. For brevity, the invention is described with reference to a riflescope but it can be adapted to any type of optical weapon sight such as a reflex sight, red-dot sight, or holographic sight.

V. BRIEF DESCRIPTION OF THE DRAWINGS

The foregoing aspects and many of the attendant advantages of this invention will become more readily apparent with reference to the following detailed description of the invention, when taken in conjunction with the appended claims and accompanying drawings, wherein:

FIG. 1(*b*) is a side-view diagram showing algebraic addition of deviation powers of thin wedge prisms in two-dimensional space.

FIG. 5(*b*) shows a method for determining aiming error using the Cartesian coordinate system.

FIG. 5(*c*) shows a preferred method for zeroing-in a riflescope according to the invention.

FIG. 5(*d*) shows another preferred method for zeroing-in the riflescope according to the invention.

VI. DETAILED DESCRIPTION OF THE INVENTION

A. Principle of Operation

Figure 1A:
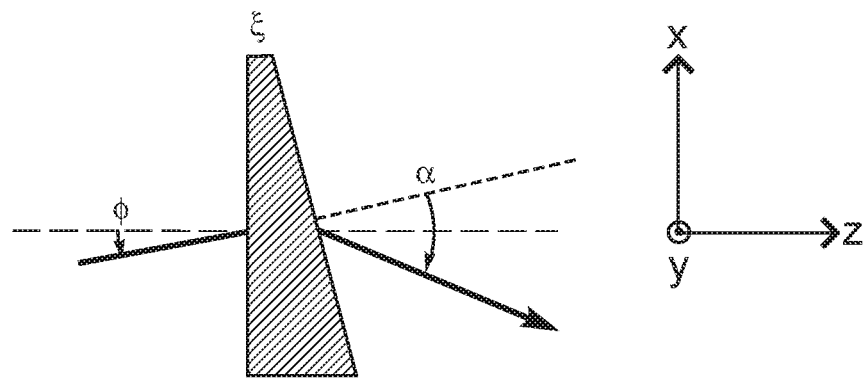
FIG. 1(*a*) is a side-view diagram showing the principle of light deviation by a thin wedge prism.

This invention uses the principle of light refraction by thin wedge prisms. According to Snell's Law when a ray of light enters a transparent material the ray's direction is deflected, based on both the entrance angle (typically measured relative to the normal to the surface) and the material's refractive index. A light beam passing through a wedge prism is deflected twice: once entering, and again when exiting. The sum of these two deflections is called the deviation angle (FIG. 1(a)).

It follows from Snell's law that the beam deviation of a wedge prism is governed by the following formula:

$$\alpha = \phi - \xi + \sin^{-1}\left(\sqrt{n^2 - \sin^2\phi} \times \sin\xi - \sin\phi\cos\xi\right). \quad (1)$$

In the above formula $\alpha$ is the beam deviation angle, $\xi$ is the apex angle of the prism, $\phi$ is the incidence angle of the incoming beam and n is the index of refraction of the glass material used for making the prism. When the incident light is close to normal to the prism surface (i.e. $\phi \approx 0$) and for a thin prism (i.e. $\xi \leq 60$), the formula (1) reduces to $$\alpha \approx (n-1)\xi. \quad (2)$$

Therefore, for thin wedge prisms the deviation angle $\alpha$ is practically independent of the incidence angle and is solely determined by the prism's apex angle and glass type. In this invention, the deviation angle $\alpha$ is also called "deviation power" or "deviation magnitude" associated with a thin wedge prism. For the purposes of this invention, the wedge prisms will be designed such that their deviation powers $\alpha_i$ will be a fraction of a degree. Example values are 1 MOA, 2 MOA, and 5 MOA.

Figure 2:
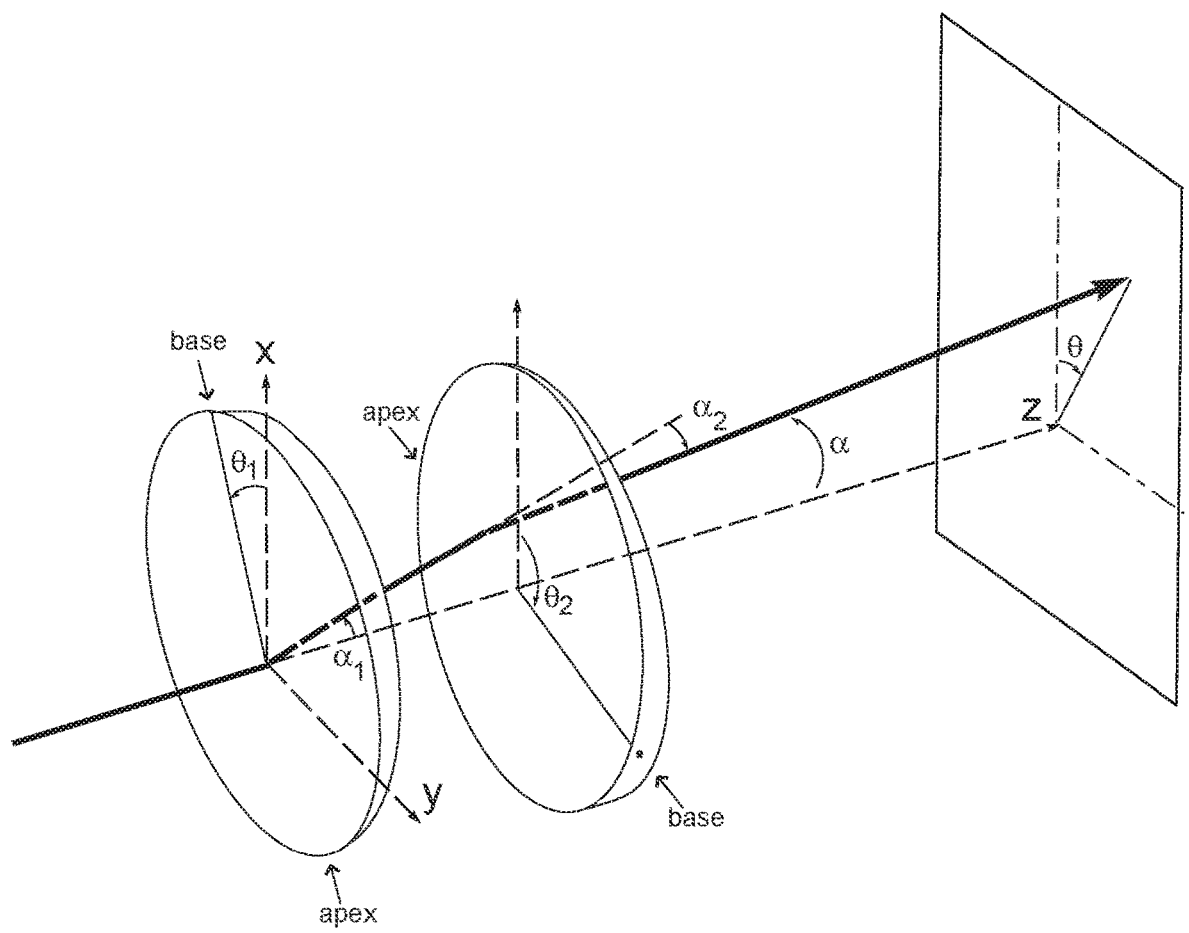
FIG. 2 is a perspective-view diagram showing vector addition of deviation powers of thin wedge prisms in three-dimensional space.
Figure 3:
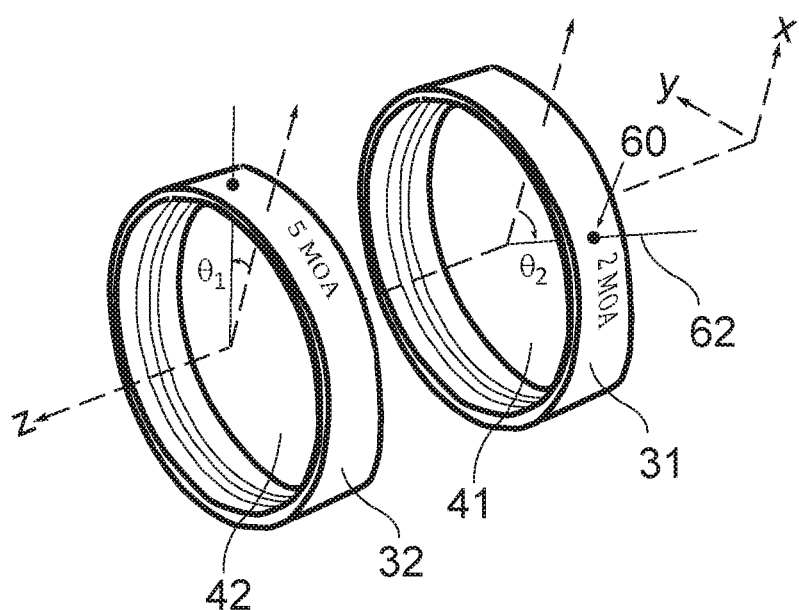
FIG. 3 is a perspective-view diagram showing the deviation axis and the deviation power being marked on the housing of two wedge prisms. This figure also shows how the deviation axes of wedge prisms can be oriented in a desired direction in the x-y plane.

A wedge prism deflects light towards its base. Therefore, we define a hypothetical axis which connects the apex of the prism to its base, as its "deviation axis". The "deviation direction" or "deviation orientation" $\theta$ of the prism is defined as the angle between the prism's deviation axis and the vertical axis (x axis as shown in FIGS. 2 and 3).

If two or more thin wedge prisms are stacked together, their deviation powers will be additive. FIG. 2 shows a simple (two-dimensional) example of this additive property. In this figure, two thin wedge prisms are stacked such that their apex points towards the x direction. In this case, the total deviation power $\alpha$ will be the algebraic sum of the deviation powers of each prism: $\alpha = \alpha_1 + \alpha_2$.

In three dimensional space, it is possible to orient a thin wedge prism such that its deviation axis points to any direction in the x-y plane. In this case, the total deviation provided by the prisms will be the vector sum of the deviation provided by each individual prism. With reference to FIG. 3, let $a_1 = (\alpha_1, \theta_1)$ be the vector in polar coordinates representing the deviation power $\alpha_1$ and the deviation direction (orientation) $\theta_1$ of the first wedge prism. Similarly, let $a_2 = (\alpha_2, \theta_2)$ be the vector in polar coordinates representing the deviation power $\alpha_2$ and the deviation direction (orientation) $\theta_2$ of the second wedge prism. The combined deviation $a = (\alpha, \theta)$ of the two prisms will be $$a = a_1 + a_2. \quad (3)$$

Calculating the total deviation power a and the deviation direction $\theta$ strictly from the polar coordinates $(\alpha_1, \theta_1)$ and $(\alpha_1, \theta_1)$ requires solving complicated trigonometric formulas. However, this calculation is greatly simplified if the two wedge prisms are oriented such that their deviation axes are parallel, i.e $\theta_1 = \theta_2$. In this case the deviation power of the prisms are simply added together:

$$\alpha = \alpha_1 + \alpha_2 \quad (4)$$

$$\theta = \theta_1 = \theta_2 \quad (5)$$

Another situation where it is relatively easy to calculate the total deviation power $\alpha$ and the deviation direction $\theta$ is when then two wedge prisms have equal deviation power, i.e. $\alpha_1 = \alpha_2$. In this situation the resulting deviation direction will be along the bisector of the angle $\delta$ formed between the deviation axes of the prisms. The deviation power can range between 0 and $2\alpha_1$ depending on the angle $\delta$:

$$\alpha = 2\alpha_1 \cos\left(\frac{\delta}{2}\right), \delta \triangleq \theta_2 - \theta_1 \quad (6)$$

$$\theta = \frac{\theta_1 + \theta_2}{2} \text{ (bisector of } \delta) \quad (7)$$

B. Method for Zeroing-in a Riflescope Using Attachable Wedge Prisms

To use the optical adjustment method disclosed in the present invention, the user should first mount the riflescope on his rifle. The riflescope should be mounted on top of the receiver (or barrel) such that its optical axis is in line with the axis of the barrel. Due to the dimensional variations in the mounts, the optical axis of the riflescope is rarely exactly in line with the barrel. The fact that the trajectory of a bullet does not coincide with the line of sight (which is always straight) necessitates additional corrections as well. Therefore, the user should determine if there is any correction required to align the "point of aim" shown by the riflescope with the actual "point of impact" of the rifle.

Figure 5A:
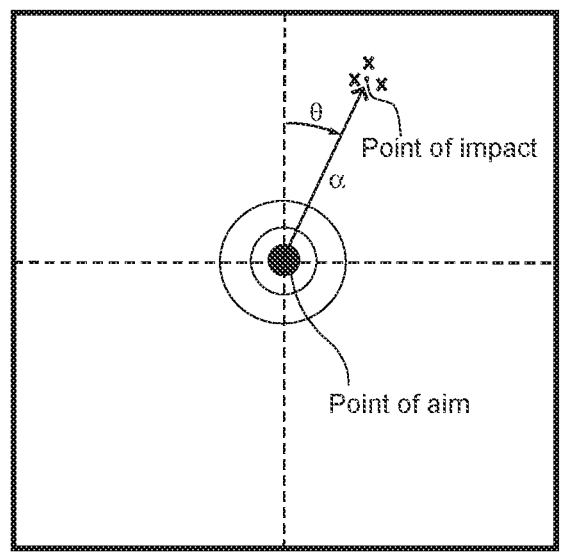
FIG. 5(*a*) shows a method for determining aiming error using the polar coordinate system.

This misalignment between the point of aim and the point of impact (also called aiming error) can be determined by shooting a group of three shots at a test target located 100 m away (see FIGS. 5(a) and (b)). Once the magnitude and the direction of the aiming error is determined, the user should select one or more corrector wedge prisms supplied with the riflescope and attach them in front of the objective lens using a fastener means provided. The wedge prisms should be selected and mounted such that their combined deviation power (considered as a vector) compensates for the aiming error (see FIGS. 5(c) and (d)).

After attaching the wedge prisms, the user may fire another group of three shots at the test target to verify that his rifle shoots to the desired point of impact. If any fine tuning is needed, the user can add more corrector prisms or adjust the orientation of the attached prisms slightly. Once the rifle's zero is verified, the shooter can take his rifle to the field and use it for hunting or target shooting.

The examples below further illustrate the method of zeroing-in the riflescope according to the present invention. The first example shows how to correct the point of aim of the riflescope using just a single wedge prism:

Example 1

Consider that a hunter purchases a riflescope and mounts it on his rifle. In a weekend, the hunter goes to the shooting range and test-fires his rifle at 100 m. He examines the point of impact on the target and determines that a correction of 15 cm along a direction of 30° measured clockwise from the vertical axis is required to zero-in the rifle (FIG. 5(a)). The hunter then contacts the manufacturer and orders a corrector prism with deviation power of α=15 cm. He may do this conveniently over the Internet by filling in a web-based form. In just a few days, he receives a custom-made corrector prism by mail. He attaches this prism to the front of the riflescope at the direction θ=300. His rifle is now zeroed in! The hunter can take his rifle to the shooting range the next weekend and verify the rifle's zero by firing a second test group. Once the accuracy of the zero is verified, the hunter can hunt with his accurate rifle for years to come, the zero will never shift.

The next example shows how the aiming correction can be performed using two corrector prisms oriented along x or y coordinates:

Example 2

Figure 5B:
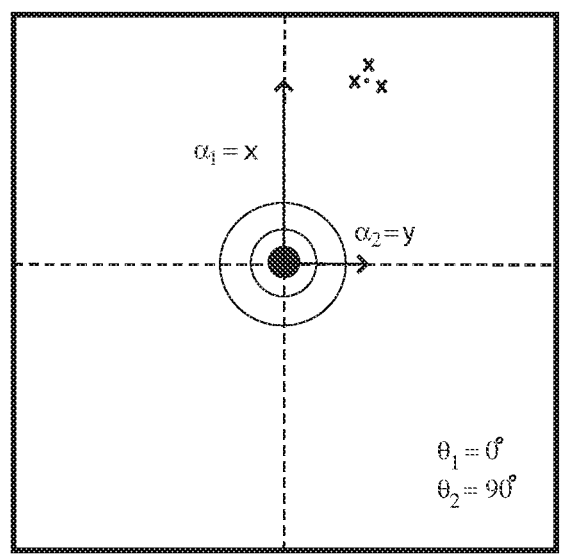

Assume that a hunter using the riflescope according to this invention determines the aiming error of his rifle in Cartesian coordinates as shown in FIG. 5(b). Assume that the required correction vector has the coordinates (x=10 cm, y=5 cm).

The hunter first selects a wedge prism with deviation power of 10 cm at 100 m (1 mil) and attaches it to the front (objective side) of the riflescope such that the deviation axis of the prism points in the x direction (vertical). He then chooses a wedge prisms with deviation power of 5 cm at 100 m (0.5 mil) and attaches it to the front of riflescope such that the deviation axis of the prism points in the y direction. The riflescope is now zeroed-in. The hunter can fire a second group of three shots to verify his zero. The bullets should now hit near the center of the target.

While it is easy to use Cartesian coordinates, it is usually more efficient to zero-in the riflescope in polar coordinates. The next example shows how to zero-in a riflescope using two corrector prisms whose deviation axes are kept aligned:

Example 3

Figure 5C:
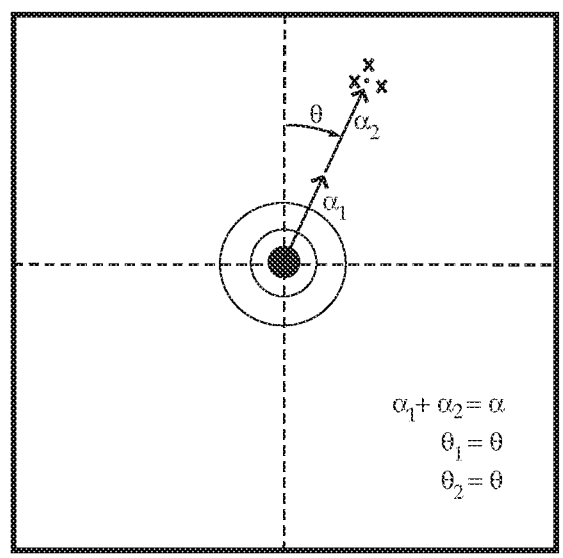

Assume that a hunter purchases the riflescope described in this invention and mounts it on his new high-quality hunting rifle. Next, he takes the rifle to the shooting range and using a steady bench rest fires three shots aiming at the center of a target located 100 m away. Upon examining the target, he determines that a hypothetical vector connecting his point of aim to the the centroid of the holes (which indicate the rifle's point of impact) is 15 cm long and has a 30 degree angle measured clockwise from the vertical axis. With reference to FIG. 5(c), this means α=15 cm and θ=30° where α and θ denote the magnitude and the direction of the correction vector in polar coordinates.

Once the magnitude and the direction of required correction is determined the hunter selects two wedge prisms with deviation power of 0.5 mil (5 cm at 100 m) and 1 mil (10 cm at 100 m) from the collection of wedge prisms supplied with the riflescope. He stacks these prisms together making sure that their deviation axes are aligned. This way, the deviation power of the prisms will be simply added to create a total deviation power of 15 cm at 100 m (equal to the required correction magnitude). The hunter then attaches the two prisms to the front of his riflescope such that the deviation axis of the prisms is oriented at 30 degrees clockwise from the vertical axis as shown in FIG. 5(c).

The riflescope is now zeroed-in! The hunter can fire another group of three shots to verify that his rifle's point of aim is aligned with point of impact.

In the final example, we consider a case where the magnitude of the required correction is not an exact sum of the magnitudes provided by the wedge prisms supplied with the riflescope:

Example 4

Figure 5D:
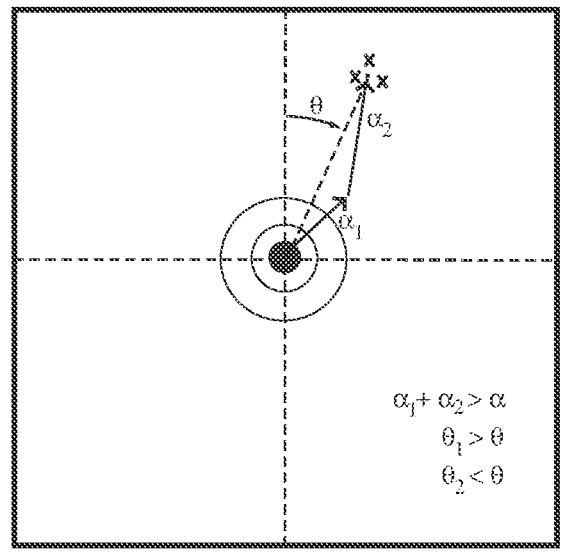
Figure 6:
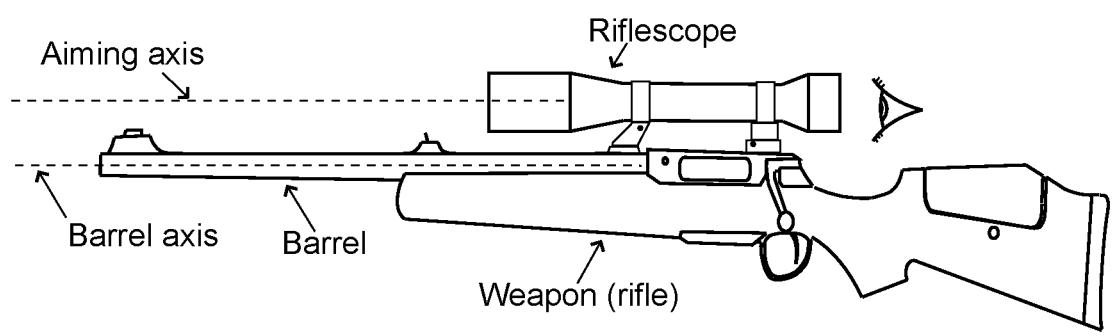
FIG. 6 shows a prior art riflescope being mounted on a prior art weapon (rifle). This figure also illustrates the riflescope's aiming axis and the rifle's barrel axis.

Consider the scenario described in Example 3 but assume that the distance between the point of impact and the point of aim was slightly shorter. For example, let's assume α=18 cm and θ=30°. The hunter should use two wedge prisms with $\alpha_1$=10 cm and $\alpha_2$=10 cm (i.e. of equal power and whose sum being larger than the required correction magnitude). Next, he should orient the deviation axes of the prisms such that $\theta_1$ is slightly more than 30° and $\theta_2$ is slightly less than 30° as shown in FIG. 5(d). By doing so, the two prisms would produce a total deviation less than their algebraic sum of 20 cm.

The hunter may use the formula (7) mentioned in Section VI-A to first calculate an acute angle δ such that the required deviation magnitude α=18 cm is produced:

$$18 = 2 \times 10 \times \cos\left(\frac{\delta}{2}\right) \Rightarrow \delta \cong 26° \qquad (8)$$

Then, attach the wedge prisms to the front side of his riflescope such that the bisector of the angle between the prisms is aligned with the required correction orientation θ=30°. This is achieved when $$\theta_1 = 30° - \frac{\delta}{2} = 17° \text{ and } \theta_2 = 30° + \frac{\delta}{2} = 43° \qquad (9)$$

Alternatively, the hunter can use trial and error and adjust $\theta_1$ and $\theta_2$ manually such that a total deviation of 18 cm in the direction of 30° from the vertical axis is achieved.

The examples above illustrate how the method disclosed in this invention can be used to zero-in a non-adjustable riflescope (or other optical sight) with as few as a single wedge prism. In most practical cases, a user should be able to zero-in the riflescope using one or two wedge prisms following the rules of vector addition as described in subsection VI-A.

It is preferred that the wedge prisms are mounted inside a housing so that they can be more conveniently attached to an optical weapon sight. It is also preferred that the deviation power and the deviation axis of each prism is marked on its housing as shown in FIG. 3. With reference to this figure, the prism housings 31 and 32 include indicia 60 (printed as dots) that designate the deviation axes of the wedge prisms 41 and 42 mounted inside them. The deviation powers are also printed on the housings in MOA units.

Figure 4:
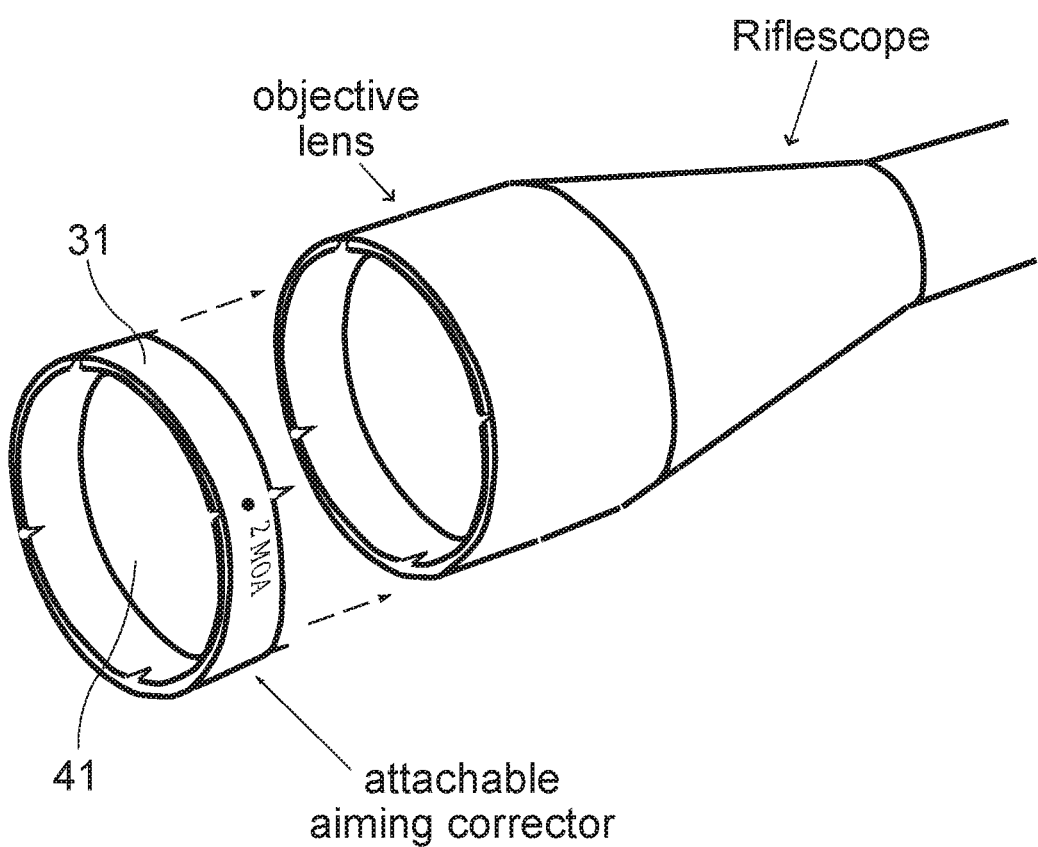
FIG. 4 is a perspective-view diagram showing a wedge prism being attached to the front (objective side) of a riflescope to correct the point of aim.

FIG. 4 shows a wedge prism 41 being attached to the objective side of a riflescope to correct its point of aim. As shown in this figure. the wedge prism 41 is mounted inside a housing 31 that facilitates its attachment to the front (objective side) of riflescope. The housing 31 also facilitates orienting the wedge prism 41 such that its deviation axis (marked as a dot on the outside of the housing) is aligned with the required correction direction.

VII. ADVANTAGES OVER THE PRIOR ART

Figure 1B:
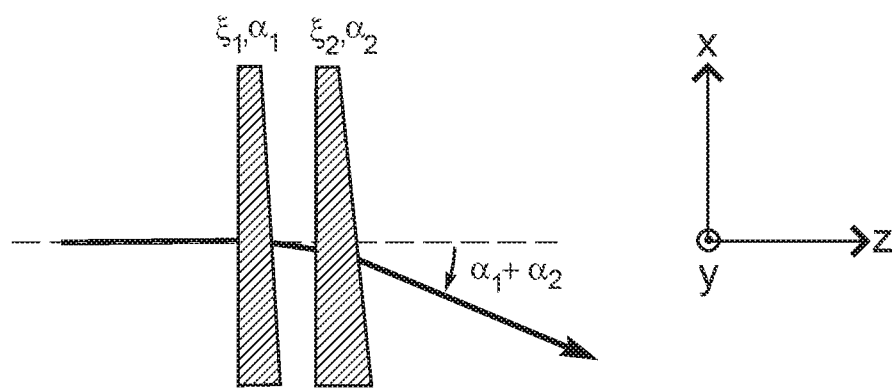

The method introduced in this invention has several significant advantages over the prior art, including but not limited to the following:

1. HIGHER RELIABILITY: The riflescope used in the present invention requires no internal adjustment mechanisms. The lenses, the reticle and the prisms can be all securely attached to the housing. Therefore, there is no possibility of the point of aim shifting due to the rifle's recoil or rough usage in the field.
2. REDUCED MECHANICAL COMPLEXITY: There is no need for turrets, complex mechanical hinges, tillable inner tube, or other mechanisms which are used in a traditional riflescope to shift the reticle.
3. UNLIMITED VERTICAL AND HORIZONTAL ADJUSTMENT RANGE: In traditional riflescopes, the range of available vertical and horizontal adjustment is limited by the diameter of the tubular middle section of the riflescope body. This is because the reticle and the erector assembly are physically shifted to the sides or up-down inside the main tube (see FIGS. 1 and 2). Also, vertical and horizontal adjustments will limit each other when they are near their maximum limits (see FIG. 2). In the present invention, the total amount of available adjustment is independent of the dimensions of the riflescope's body and practically unlimited.
4. APPLICABLE TO MANY TYPES OF OPTICAL SIGHTS: The method of using attachable wedge prisms described in this invention is not limited to telescopic sights. It can be used to adjust the point of aim of any optical weapon sight such as reflex sights, red-dot sights and holographic sights.

VIII. CONCLUSION, RAMIFICATIONS, AND SCOPE

The foregoing disclosure is believed to be sufficient to enable an ordinary person skilled in the art to build and use the invention. In addition, the description of specific embodiments will so fully reveal the general nature of the invention that others can, by applying current knowledge, readily modify and/or adapt for various applications such specific embodiments without undue experimentation and without departing from the generic concept. For example, the steps required to perform the methods of zeroing-in a riflescope described in Section VI-B can be performed by a machine rather than a human user (a robotic device used in an assembly line can mount a telescopic sight on a rifle, measure the angular misalignment between the aiming axis and the barrel axis, and attach a required number of prisms to correct the riflescope's point of aim). Such adaptations and modifications should and are intended to be comprehended within the meaning and range of equivalents of the disclosed embodiments.

It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one of ordinary skill in the art. Thus, the scope of the invention should be determined by the appended claims and their legal equivalents, as opposed to the embodiments illustrated.

What is claimed is:

1. A method for zeroing-in an optical weapon sight, said optical weapon sight being mounted on a weapon, said optical weapon sight having a front side facing a target, said optical weapon sight having a rear side facing a user, said optical weapon sight showing a point of aim, said point of aim defining an aiming axis which is a hypothetical axis that extends outwardly from the optical sight towards a target and on which said point of aim is located, said weapon having a barrel, said barrel having a barrel axis which is a longitudinal axis that goes through a center of said barrel, said weapon having a point of impact, said method comprising the steps of:
   a. directing a user to determine a correction magnitude and a correction direction such that the point of aim shown by said optical weapon sight could be brought in correspondence with the point of impact of said weapon,
   b. providing a wedge prism, said wedge prism having a deviation power and a deviation axis, said deviation power being substantially equal to said correction magnitude,
   c. directing a user to attach said wedge prism to the front side of said optical weapon sight such that the deviation axis of said wedge prism is substantially aligned with said correction direction.

2. The method of claim 1 further comprising said correction magnitude and said correction direction in step (a) being determined by measuring an angular misalignment between said aiming axis and said barrel axis.

3. The method of claim 1 further comprising said correction magnitude and said correction direction in step (a) being determined by firing one or more test shots at a target positioned at a known distance.

4. The method of claim 1 further comprising said wedge prism in step (b) being mounted inside a housing, said housing having a marking indicating the deviation axis of said wedge prism.

5. The method of claim 1 further comprising said wedge prism in step (b) being mounted inside a housing, said housing having a marking indicating the deviation power of said wedge prism.

6. A method for zeroing-in an optical weapon sight, said optical weapon sight being mounted on a weapon, said optical weapon sight having a front side facing a target, said optical weapon sight having a rear side facing a user, said optical weapon sight showing a point of aim, said point of aim defining an aiming axis which is a hypothetical axis that extends outwardly from the optical sight towards a target and on which said point of aim is located, said weapon having a barrel, said barrel having a barrel axis which is a longitudinal axis that goes through a center of said barrel, said weapon having a point of impact, said method comprising the steps of:
   a. directing a user to determine a correction magnitude and a correction direction such that the point of aim shown by said optical weapon sight could be brought in correspondence with the point of impact of said weapon,
   b. providing a collection of wedge prisms, each said wedge prism in said collection having a certain deviation power and a deviation axis,
   c. directing a user to select one or more said wedge prisms from said collection such that their deviation powers add up to a net power equal to or close to said correction magnitude,
   d. directing a user to attach the wedge prisms selected in step (c) to the front side of said optical weapon sight such that the deviation axes of the selected wedge prisms are substantially aligned with said correction direction.

7. The method of claim 6 further comprising said correction magnitude and said correction direction in step (a) being determined by measuring an angular misalignment between said aiming axis and said barrel axis.

8. The method of claim 6 further comprising said correction magnitude and said correction direction in step (a) being determined by firing one or more test shots at a target positioned at a known distance.

9. The method of claim 6 further comprising each said wedge prism in said collection mentioned in step (b) being mounted inside a housing, said housing having a marking indicating the deviation axis of the wedge prism mounted in said housing.

10. The method of claim 6 further comprising each said wedge prism in said collection mentioned in step (b) being mounted inside a housing, said housing having a marking indicating the deviation power of the wedge prism mounted in said housing.

11. The method of claim 6 further comprising said collection mentioned in step (b) being comprised of wedge prisms having any of the following deviation powers: 0.1 mil, 0.2 mil, 0.5 mil, 1 mil, 2 mil, 5 mil, or 10 mil.

12. The method of claim 6 further comprising said collection mentioned in step (b) being comprised of wedge prisms having any of the following deviation powers: 0.5 MOA, 1 MOA, 2 MOA, 5 MOA, 10 MOA, 20 MOA, or 30 MOA.

13. A method for zeroing-in an optical weapon sight, said optical weapon sight being mounted on a weapon, said optical weapon sight having a front side facing a target, said optical weapon sight having a rear side facing a user, said optical weapon sight showing a point of aim, said point of aim defining an aiming axis which is a hypothetical axis that extends outwardly from the optical sight towards a target and on which said point of aim is located, said weapon having a barrel, said barrel having a barrel axis which is a longitudinal axis that goes through a center of said barrel, said weapon having a point of impact, said method comprising the steps of:
  a. directing a user to determine a correction magnitude and a correction direction such that the point of aim shown by said optical weapon sight could be brought in correspondence with the point of impact of said weapon,
  b. providing a collection of wedge prism, each said wedge prism in said collection having a certain deviation power and a deviation axis,
  c. directing a user to select two wedge prisms from said collection such that their deviation powers add up to a number greater than said correction magnitude determined in step (a),
  d. directing a user to attach said two wedge prisms selected in step (c) to the front side of said optical weapon sight such that
    d1. the deviation axes of said two wedge prisms form an acute angle with respect to each other, said acute angle having a bisector,
    d2. said acute angle being selected such that said two wedge prisms produce a net deviation power substantially equal to said correction magnitude determined in step (a),
    d3. said bisector of said acute angle being substantially aligned with said correction direction determined in step (a).

14. The method of claim 13 further comprising said correction magnitude and said correction direction in step (a) being determined by measuring an angular misalignment between said aiming axis and said barrel axis.

15. The method of claim 13 further comprising said correction magnitude and said correction direction in step (a) being determined by firing one or more test shots at a target positioned at a known distance.

16. The method of claim 13 further comprising each said wedge prism in said collection mentioned in step (b) being mounted inside a housing, said housing having a marking indicating the deviation axis of the wedge prism mounted in said housing.

17. The method of claim 13 further comprising each said wedge prism in said collection mentioned in step (b) being mounted inside a housing, said housing having a marking indicating the deviation power of the wedge prism mounted in said housing.

* * * * *